US012614417B2

(12) United States Patent
Uluyol et al.

(10) Patent No.: US 12,614,417 B2
(45) Date of Patent: Apr. 28, 2026

(54) SYSTEMS AND METHODS FOR MONITORING AIRCRAFT EMISSIONS

(71) Applicant: HONEYWELL INTERNATIONAL INC., Charlotte, NC (US)

(72) Inventors: Onder Uluyol, Phoenix, AZ (US); Chris Hickenbottom, Phoenix, AZ (US); Katerina Gregorova, Brno (CZ)

(73) Assignee: HONYWELL INTERNATIONAL INC., Charlotte, NC (US)

( * ) Notice: Subject to any disclaimer, the term of this patent is extended or adjusted under 35 U.S.C. 154(b) by 91 days.

(21) Appl. No.: 18/645,635

(22) Filed: Apr. 25, 2024

(65) Prior Publication Data

US 2025/0336246 A1 Oct. 30, 2025

(51) Int. Cl.
*G07C 5/08* (2006.01)

(52) U.S. Cl.
CPC ......... *G07C 5/0808* (2013.01); *G07C 5/0816* (2013.01)

(58) Field of Classification Search
CPC ............................ G07C 5/0808; G07C 5/0816
See application file for complete search history.

(56) References Cited

U.S. PATENT DOCUMENTS 9,269,205 B1 2/2016 Lamkin et al.
2012/0173293 A1 7/2012 Motley et al.
2014/0138478 A1 5/2014 Cox et al.
2021/0256781 A1 8/2021 Jörn et al.
2023/0419842 A1 12/2023 Schaub et al.
2025/0165005 A1* 5/2025 Ayhan .................... G06N 20/20

FOREIGN PATENT DOCUMENTS

CN 106599533 A 4/2017
CN 113011640 A 6/2021
EP 3217364 A2 9/2017
WO 2021134851 A1 7/2021

* cited by examiner

*Primary Examiner* — Michael V Kerrigan
(74) *Attorney, Agent, or Firm* — Ingrassia, Fisher & Lorenz LLP

(57) ABSTRACT

Systems and methods are provided for determining carbon emissions for an aircraft. The systems may include a communication system configured to receive engine operation data from the aircraft indicating operating conditions of an engine of the aircraft during operation thereof, and a controller operably coupled to the communication system and configured to, with one or more processors: receive the engine operation data via the communication system, determine amounts of time that the engine was in each of two or more flight phases based on the engine operation data, determine a cumulative fuel consumption of the engine for more than one flight of the aircraft based on the engine operation data, the amounts of time that the engine was in each of the two or more flight phases, and fuel flow rates of the engine, and determine engine carbon emissions based on the cumulative fuel consumption for the engine.

18 Claims, 4 Drawing Sheets

SYSTEMS AND METHODS FOR MONITORING AIRCRAFT EMISSIONS

TECHNICAL FIELD

The present invention generally relates to aircraft emissions, and more particularly relates to systems and methods for monitoring aircraft emissions specific to flight phases, a single flight, and/or more than one flight.

BACKGROUND

Increased pressure is being exerted on governments to diminish carbon emissions and play a more significant role in combating global warming. Consequently, businesses and industries are encountering potential regulations and fines if they fail to devise tangible strategies to decrease emissions and enhance efficiency. Aviation, including air transport/cargo and business aviation, is a particular focus due to its contribution to environmental issues. To preempt these regulations, companies in the aviation sector are proactively taking steps such as investing in the development of biofuel and sustainable aviation fuel.

Hence, there is an ongoing desire for systems and methods capable of reducing emissions in the aviation industry. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In various embodiments, a method is provided for determining carbon emissions for an aircraft. The method may include, with one or more processors of a controller: receiving engine operation data from the aircraft indicating operating conditions of an engine of the aircraft during operation thereof, determining amounts of time that the engine was in each of two or more flight phases based on the engine operation data, determining a cumulative fuel consumption of the engine for one or more flights of the aircraft based on the engine operation data, the amounts of time that the engine was in each of the two or more flight phases, and fuel flow rates of the engine, and determining engine carbon emissions based on the cumulative fuel consumption for the engine.

In various embodiments, a system is provided for determining carbon emissions for an aircraft. The system may include a communication system configured to receive engine operation data from the aircraft indicating operating conditions of an engine of the aircraft during operation thereof, and a controller operably coupled to the communication system and configured to, with one or more processors: receive the engine operation data via the communication system, determine amounts of time that the engine was in each of two or more flight phases based on the engine operation data, determine a cumulative fuel consumption of the engine for more than one flight of the aircraft based on the engine operation data, the amounts of time that the engine was in each of the two or more flight phases, and fuel flow rates of the engine, and determine engine carbon emissions based on the cumulative fuel consumption for the engine.

Furthermore, other desirable features and characteristics of the system and method will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word “exemplary” means “serving as an example, instance, or illustration.” Thus, any embodiment described herein as “exemplary” is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Systems and methods disclosed herein provide for determining carbon emissions for aircraft. In some embodiments, the systems and methods herein are configured to determine carbon emissions for each phase of flight of aircraft. The phases of flight may vary depending on the aircraft and its use. Common phases of flight include taxi, takeoff, climb, cruise, descent, approach, and landing. The system and methods may allow users to track and manage emissions, such as carbon emissions, for individual aircraft as well as entire fleets of aircraft. In some embodiments, the systems and methods may allow for the purchase of carbon credits for offsetting carbon emissions of the aircraft.

It should be noted that the term aircraft, as utilized herein, may include any manned or unmanned object capable of flight. Examples of aircraft may include, but are not limited to, fixed-wing aerial vehicles (e.g., propeller-powered or jet powered), rotary-wing aerial vehicles (e.g., helicopters), manned aircraft, unmanned aircraft (e.g., unmanned aerial vehicles, or UAVs), delivery drones, etc. For convenience, the systems and methods will be described in reference to a manned airplane; however, as noted the systems and methods are not limited to such application.

Figure 1:
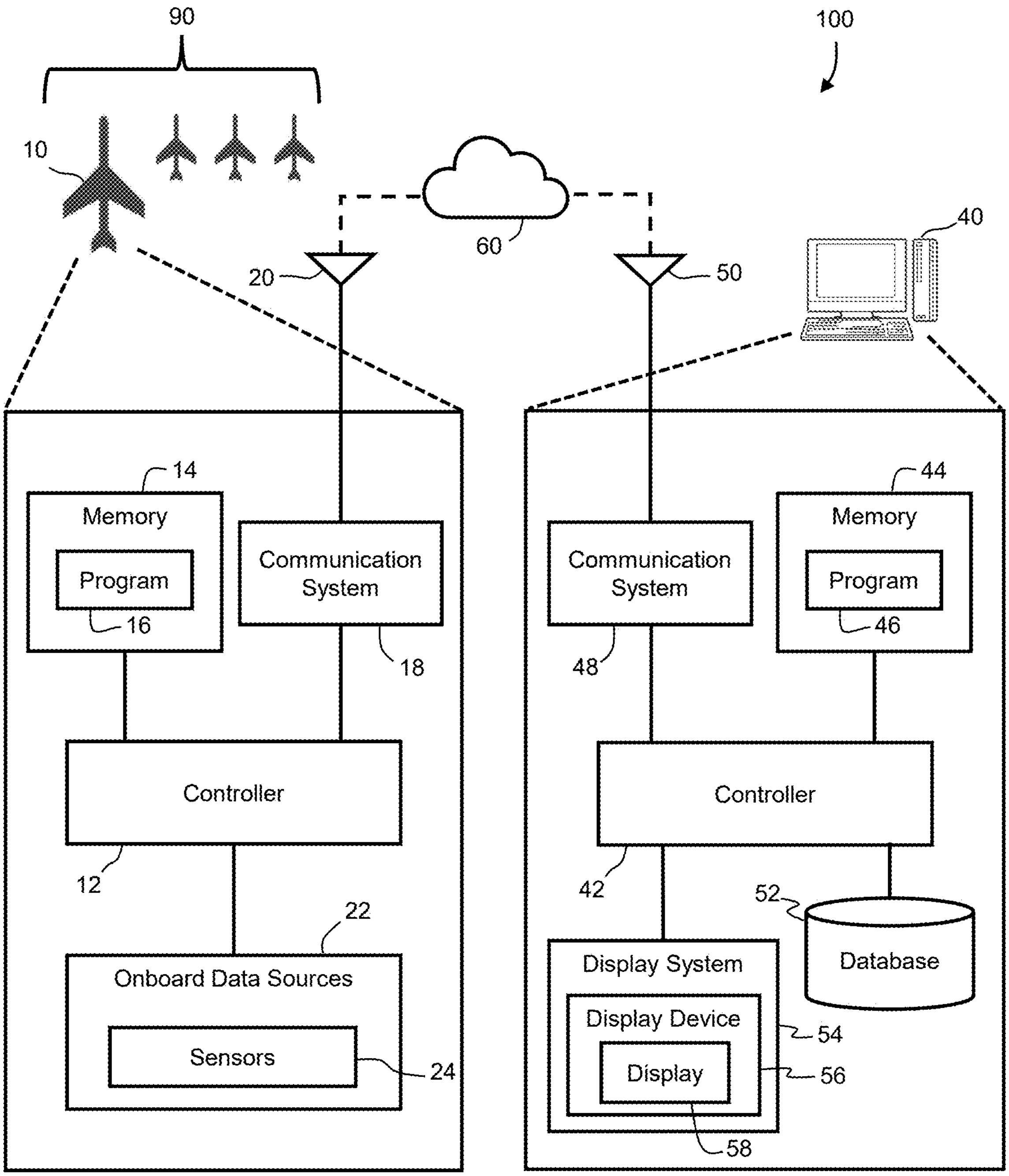
FIG. 1 schematically represents an aircraft emissions system and components thereof in accordance with an embodiment.

Referring now to FIG. 1, an aircraft emissions monitoring system 100 is illustrated in accordance with an exemplary and nonlimiting embodiment of the present disclosure. As schematically depicted in FIG. 1, the system 100 includes an aircraft 10, which is one of a fleet 90 of aircraft, and a remote system 40. Although not shown, the fleet 90 may include any number of aircraft as well as various types of aircraft. Further, although FIG. 1 does not illustrate components of aircraft of the fleet 90 other than the aircraft 10, each of the aircraft within the fleet 90 may include systems and components functionally similar to the aircraft 10.

The aircraft 10 may include a controller 12 operationally coupled to computer-readable storage media or memory 14, onboard data sources 22 including, for example, an array of sensors 24, and a communication system 18 including an antenna 20, which may wirelessly transmit data to and receive data from various external sources physically and/or geographically remote to the aircraft 10 such as the remote system 40.

The remote system 40 may include a controller 42 operationally coupled to computer-readable storage media or memory 44, one or more databases 52, at least one display device 54, which may optionally be part of a larger display system 56, and a communication system 48 including an antenna 50, which may wirelessly transmit data to and receive data from various external sources physically and/or geographically remote to the remote system 100, such as the aircraft 10 and other aircraft of the fleet 90.

Although schematically illustrated in FIG. 1 as a single unit, the individual elements and components of the system 100 can be implemented in a distributed manner utilizing any practical number of physically distinct and operatively interconnected pieces of hardware or equipment.

The term "controller," as appearing herein, broadly encompasses those components utilized to carry-out or otherwise support the processing functionalities of the system 100. Accordingly, the controllers 12 and 42 can encompass or may be associated with any number of individual processors, computer-readable memories, power supplies, storage devices, interface cards, and other standardized components.

In various embodiments, each of the controllers 12 and 42 include at least one processor, a communication bus, and a computer readable storage device or media. The processor performs the computation and control functions of the controller 12 or 42. The processor can be any custom made or commercially available processor, a central processing unit (CPU), a graphics processing unit (GPU), an auxiliary processor among several processors associated with the controller 12 or 42, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 12 or 42. The bus serves to transmit programs, data, status and other information or signals between the various components coupled to the controller 12 or 42. The bus can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor, perform logic, calculations, methods and/or algorithms, and generate data based on the logic, calculations, methods, and/or algorithms. Although only one of each of the controllers 12 and 42 are shown in FIG. 1, embodiments of the system 100 can include any number of controllers 12 and 42 that communicate over any suitable communication medium or a combination of communication mediums and that cooperate to perform logic, calculations, methods, and/or algorithms, and generate data. In various embodiments, the controllers 12 and 42 each includes or cooperates with at least one firmware and software program (generally, computer-readable instructions that embody an algorithm) for carrying-out the various process tasks, calculations, and control/display functions described herein. During operation, each of the controllers 12 and 42 may be programmed with and execute at least one firmware or software program (e.g., a program 14 for the controller 12 and a program 46 for the controller 42) that embodies one or more algorithms, to thereby perform the various process steps, tasks, calculations, and control/display functions described herein.

Each of the controllers 12 and 42 may exchange data with one or more external sources to support operation of the system 100 in various embodiments. In this case, bidirectional wireless data exchange may occur via the communication systems 18 and 48 over a communications network 60, such as a public or private network implemented in accordance with Transmission Control Protocol/Internet Protocol architectures or other conventional protocol standards. Encryption and mutual authentication techniques may be applied, as appropriate, to ensure data security.

In various embodiments, each of the communication systems 18 and 48 are configured to support instantaneous (i.e., real time or current) communications between various systems. The communication systems 18 and 48 may each incorporate one or more transmitters, receivers, and the supporting communications hardware and software required for components of the system 100 to communicate as described herein. In various embodiments, one or both the communication systems 18 and 48 may include additional communications not directly relied upon herein, such as bidirectional pilot-to-ATC (air traffic control) communications via a datalink, and any other suitable radio communication system that supports communications between the aircraft 10, the remote system 40, and various external source(s).

Each of the memories 14 and 44 can encompass any number and type of storage media suitable for storing computer-readable code or instructions, such as the programs 16 and 46, respectively, as well as other data generally supporting the operation of the system 100. As can be appreciated, each of the memories 14 and 44 may be part of their respective controller 12 or 42, separate from their respective controller 12 or 42, or part of their respective controller 12 or 42 and part of a separate system. Each of the memories 14 and 44 may be any suitable type of storage apparatus, including various different types of direct access storage and/or other memory devices.

The one or more databases 52 may be employed to receive and store data from the aircraft of the fleet including the aircraft 10, which may be updated on a periodic or iterative basis to ensure data timeliness. In various embodiments, the data may include various operational information such as operating conditions of components of the aircraft, such as one or more engines thereof, and referenced by the program 46. In various embodiments, these databases 28 may be available online and accessible remotely by a suitable wireless communication system, such as the communication system 48.

The onboard data sources 22 supplies various types of data and/or measurements to the controller 12. In various embodiments, the sensor system 22 supplies, without limitation, one or more of: inertial reference system measurements providing a location, Flight Path Angle (FPA) measurements, airspeed data, groundspeed data, vertical speed data, vertical acceleration data, altitude data, attitude data including pitch and roll measurements, yaw data, data related to ownship weight, time/date information, heading information, data related to atmospheric conditions, flight path data, flight track data, radar altitude data, geometric altitude data, wind speed and direction data. Further, in various embodiments, the onboard data sources 22 are configured to sense operating conditions of one or more components of the aircraft 10, such as one or more engines and an air conditioning (A/C) system of the aircraft 10.

With continued reference to FIG. 1, the display device 56 can include any number and type of image generating devices on which one or more displays 58 may be produced.

Figure 2:
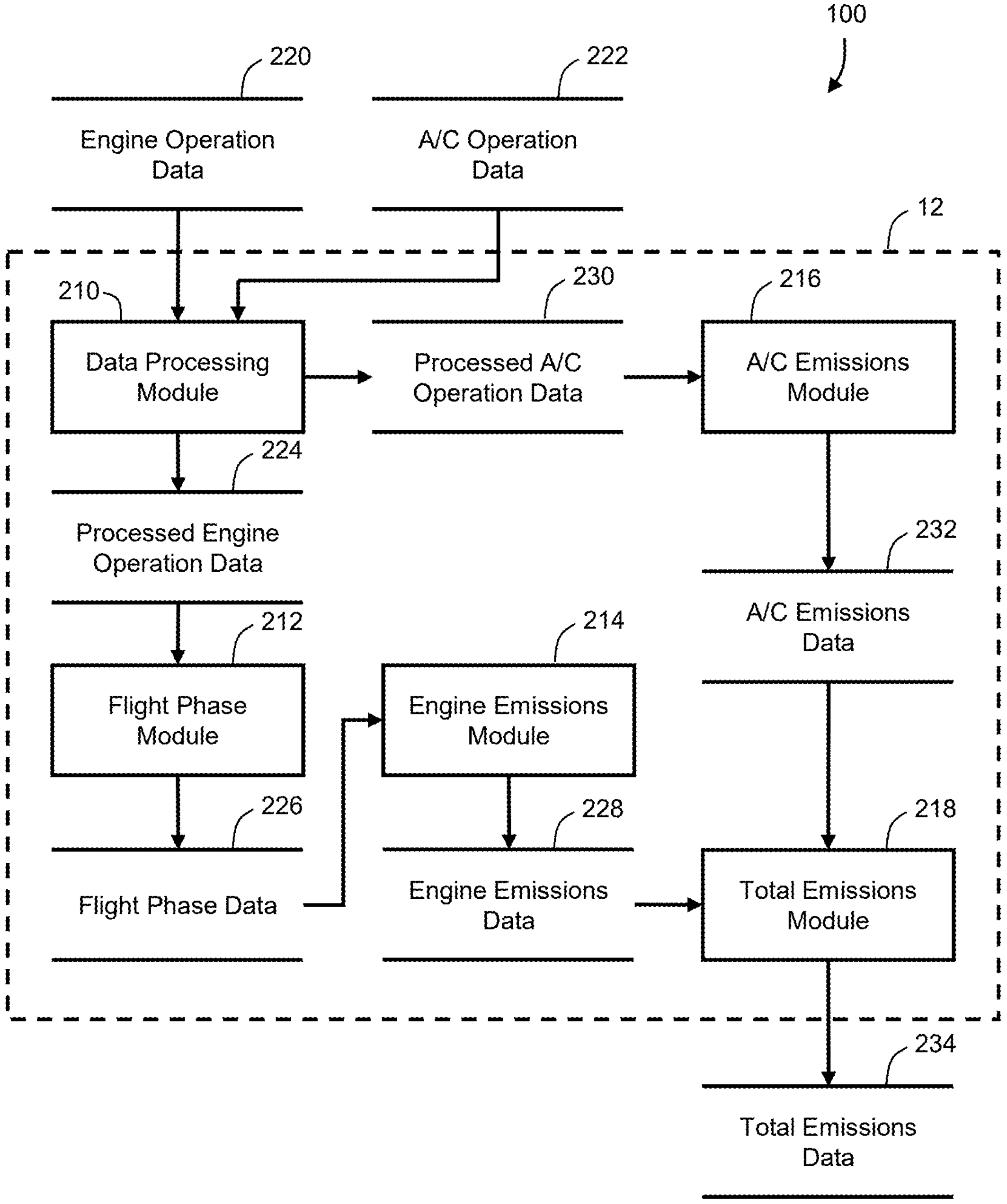
FIG. 2 is a dataflow diagram illustrating operation of the aircraft emissions system of FIG. 1 in accordance with an embodiment.

With reference to FIG. 2 and with continued reference to FIG. 1, a dataflow diagram illustrates elements of the system 100 of FIG. 1 in accordance with various embodiments. As can be appreciated, various embodiments of the system 100 according to the present disclosure may include any number of modules embedded within the controller 42 which may be combined and/or further partitioned to similarly implement systems and methods described herein. Furthermore, inputs to the system 100 may be received from other control modules (not shown) associated with the remote system 40, and/or determined/modeled by other sub-modules (not shown) within the controller 42. In various embodiments, the system 100 includes a data processing module 210, a flight phase module 212, an engine emissions module 214, an A/C emissions module 216, and a total emissions module 218.

In various embodiments, the data processing module 210 receives as input engine operation data 220 and A/C operation data 222 both received from the aircraft 10. The engine operation data 220 includes various data indicating operating conditions of engines of the aircraft 10. As used herein, the phrase operating conditions may include, for example, settings, configurations, details of use, performance, or the like. In some examples, the engine operation data 220 may include information representing continuous or periodic monitoring of each of the engines onboard the aircraft 10 while the engines are operational. The A/C operation data 222 includes various data indicating operating conditions of an A/C system of the aircraft 10. In some embodiments, the engine operation data 220 and the A/C operation data 222 are generated during more than one flight of the aircraft 10. In some examples, the A/C operation data 222 may include power level angle (PLA) bin data.

The data processing module 210 may consolidate the engine operation data 220 and the A/C operation data 222. In some examples, the data processing module 210 may combine and organize the engine operation data 220 and the A/C operation data 222 into a single, coherent dataset. In some examples, consolidating the engine operation data 220 and the A/C operation data 222 may include cleaning and standardizing the collected data to ensure consistency and accuracy (e.g., removing duplicates, correcting errors, and formatting data), combining data from different sources into a unified format (e.g., merging datasets based on common identifiers or attributes), converting the consolidated data into a format suitable for analysis or reporting (e.g., aggregating, summarizing, or reshaping the data), and/or performing data validation to verify the integrity and quality of the consolidated data.

In some embodiments, the data processing module 210 may analyze the engine operation data 220 and the A/C operation data 222 and determine whether gaps in coverage exist. For example, the controller 12 of the aircraft may have determined that signals received from one or more of the sensors 24 at various times during a flight of the aircraft 10 were unreliable. If the data processing module 210 determines that gaps in coverage exist, the data processing module 210 may adjust or modify the datasets to accommodate for the gaps. In some examples, the data processing module 210 may use modeling processes to fill the gaps in coverage with estimated information. In some embodiments, the data processing module 210 may generate a data coverage ratio indicative of the amount of the data that was estimated relative to retrieved.

The data processing module 210 generates processed engine operation data 224 that includes various data indicating operating conditions of engines of the aircraft 10. In some embodiments, the processed operation data 224 includes the data coverage ratio. The data processing module 210 generates processed A/C operation data 230 that includes various data indicating operating conditions of A/C system of the aircraft 10.

In various embodiments, the flight phase module 212 receives as input the processed engine operation data 224 generated by the data processing module 210. The flight phase module 212 separates the information indicated in the processed engine operation data 224 into separate flight phases of the aircraft. In this manner, the operating conditions of the aircraft 10 may be subsequently analyzed for each individual flight phase. As can be appreciated, engine operation may vary between flight phases. For example, an engine may be required to produce significantly more thrust during the climb phase than during the cruise phase.

In some embodiments, the processed engine operation data 224 may include bin data and the flight phase module 212 may map the binned data to the flight phases. For example, the processed engine operation data 224 may include bin data corresponding units of time to positions of a throttle of the aircraft 10. In this example, the flight phase module 212 may map the bin data to each of the flight phases and determine the amounts of time that the engine(s) were in each of the flight phases based on the time in each of the throttle positions.

The flight phase module 212 generates flight phase data 236 that includes various data indicating the time of the engine(s) in each of the flight phases.

In various embodiments, the engine emissions module 214 receives as input the flight phase data 236 generated by the flight phase module 212. The engine emissions module 214 may determine fuel consumption for the engine(s) in each of the flight phases based on the amounts of times in each of the flight phases and fuel flow rates in each of the flight phases. The engine emissions module 214 may combine the fuel consumption in each of the flight phases to determine a cumulative fuel consumption for the aircraft 10 associated with a single flight and/or multiple flights.

Once the fuel consumption has been determined, the engine emissions module 214 may determine the emissions of the engine(s) of the aircraft 10, for example, in each flight phase, for a single flight, and/or for multiple flights. In some embodiments, the emissions of the aircraft 10 may be determined based on the fuel consumption and one or more emission factors. For example, the engine emissions module 214 may determine engine carbon emissions in each flight phase for a flight of the aircraft 10 based on the fuel consumption in each of the flight phases and a carbon dioxide ($CO_2$) factor representative of an amount of carbon dioxide emitted per unit fuel consumed. The engine emissions module 214 may use various emission factors to determine the engine emissions for various pollutants and for various types of fuels. In some embodiments, the engine emissions module 214 may consider the data coverage ratio to determine the reliability of the engine emissions.

The engine emissions module 214 generates engine emissions data 228 that includes various data indicating emissions generated by the engine(s) of the aircraft 10.

In various embodiments, the A/C emissions module 216 receives as input the processed A/C operation data 230 generated by the data processing module 210. The A/C emissions module 216 may determine emissions of the A/C system of the aircraft 10 for a single flight and/or for multiple flights. The A/C emissions module 216 generates A/C emissions data 232 that includes various data indicating emissions generated by the A/C system of the aircraft 10.

In various embodiments, the total emissions module 218 receives as input the engine emissions data 228 generated by the engine emissions module 214. In various embodiments, the total emissions module 218 receives as input the A/C emissions data 232 generated by the A/C emissions module 216. The total emissions module 218 may combine the emissions of the engine(s) and the A/C system of the aircraft 10 to determine total emissions of the aircraft 10 for a single flight and/or multiple flights. The total emissions module 218 generates total emissions data 218 that includes various data indicating the emissions of the aircraft 10. The total emissions module 218 may transmit the total emissions data 218 to the one or more databases 28.

Figure 3:
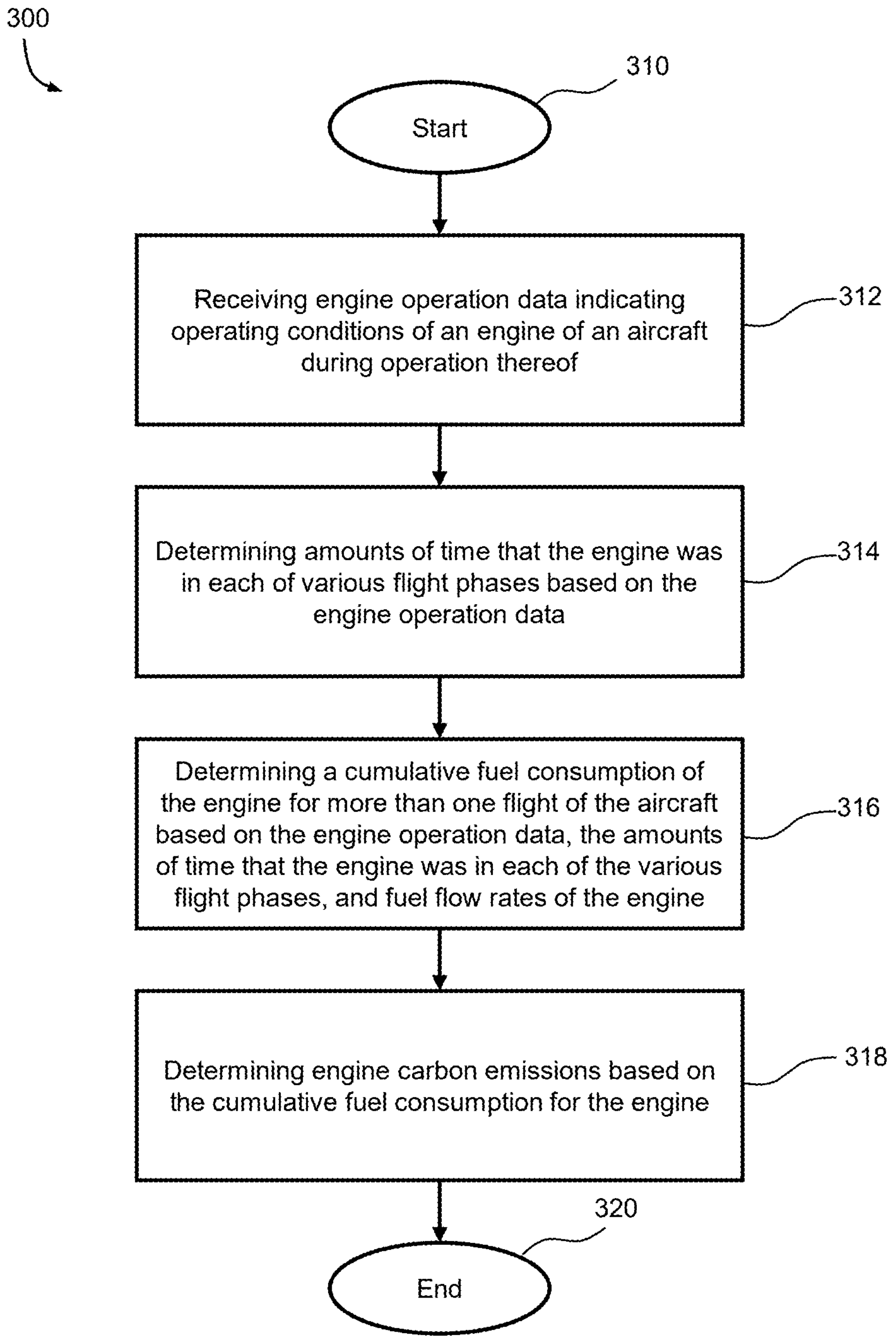
FIG. 3 is a flowchart illustrating an exemplary method for monitoring emissions of an engine of an aircraft in accordance with an embodiment.

The systems disclosed herein, including the system 100, provide for methods of monitoring emissions of one or more aircraft. For example, FIG. 3 is a flowchart illustrating an exemplary method 300 for determining carbon emissions of an engine of an aircraft. The method 300 may start at 310.

At 312, the method 300 may include receiving engine operation data indicating operating conditions of an engine of an aircraft during operation thereof. At 314, the method 300 may include determining amounts of time that the engine was in each of various flight phases based on the engine operation data. At 316, the method 300 may include determining a cumulative fuel consumption of the engine for more than one flight of the aircraft based on the engine operation data, the amounts of time that the engine was in each of the various flight phases, and fuel flow rates of the engine. At 318, the method 300 may include determining engine carbon emissions based on the cumulative fuel consumption for the engine. The method 300 may end at 320.

Figure 4:
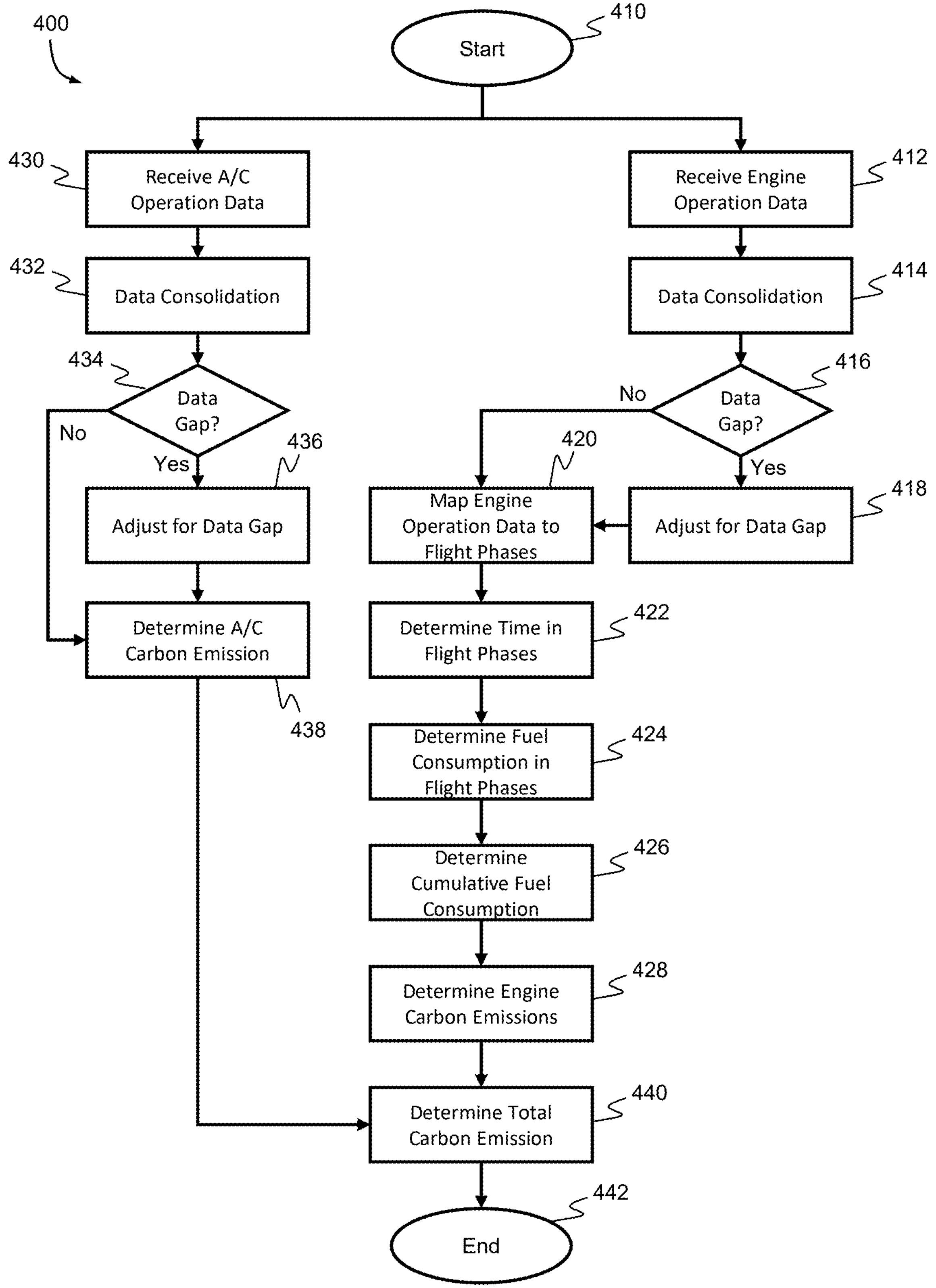
FIG. 4 is a flowchart illustrating an exemplary method for monitoring total emissions of an aircraft in accordance with an embodiment.

As another example, FIG. 4 is a flowchart illustrating an exemplary method 400 for determining total carbon emissions of an aircraft. The method 400 may start at 410.

At 412, the method 400 may include receiving engine operation data indicating operating conditions of an engine of an aircraft during operation thereof. At 414, the method 400 may include performing data consolidation processes on the engine operation data. At 412, the method 400 may include determining whether gaps in the engine operation data exist. If gaps in coverage are detected at 416, the method 400 may include adjusting the operation data to accommodate for the gaps, such as by estimating operating conditions of the engine to fill the gaps in coverage.

Once the gaps have been filled 418, or if no gaps in coverage are detected at 416, the method 400 may include, at 420, mapping the engine operation data to flight phases of the aircraft. For example, the engine operation data may be binned to positions of a throttle of the aircraft, which may be analyzed to map the operating conditions of the engine to the flight phases.

At 422, the method 400 may include determining the amount of time that the aircraft was in each flight phase based on the mapped engine operation data. At 424, the method 400 may include determining fuel consumption of the engine while in each of the flight phases based on the amounts of time that the aircraft was in each of the flight phases and fuel flow rates while in each of the flight phases. At 426, the method 400 may include determining cumulative fuel consumption of the engine based on the fuel consumption in each of the flight phases. At 428, the method 400 may include determining carbon emissions of the engine based on the fuel consumption thereof. In some examples, the engine carbon emissions may be determined using one or more emissions factors (e.g., a carbon dioxide factor) indicative of emissions produced per unit of fuel consumed. For example, if a sustainable aviation fuel is used, the engine carbon emissions may be determined at least partially using a sustainable aviation fuel factor.

At 430, the method 400 may include receiving A/C operation data indicating operating conditions of an A/C system of an aircraft during operation thereof. At 432, the method 400 may include performing data consolidation processes on the A/C operation data. At 434, the method 400 may include determining whether gaps in the data exist. If gaps in coverage are detected at 434, the method 400 may include adjusting the A/C operation data to accommodate for the gaps, such as by estimating operating conditions of the A/C system to fill the gaps in coverage. Once the gaps have been filled 436, or if no gaps in coverage are detected at 434, the method 400 may include, at 438, determining carbon emissions of the A/C system based on the A/C operation data.

At 440, the method 400 may include determining a total carbon emissions of the aircraft based on the engine carbon emissions and the A/C system carbon emissions. The method 400 may end at 442.

In some embodiments, the method 400 may include generating, on a display device (e.g., the display device 56), the determined engine carbon emissions, A/C carbon emissions, total carbon emissions, and/or other information generated to a user. The information may be displayed in categories such as emissions for each flight phase of a single flight or multiple flights, total emissions of a single flight, multiple flights, by a single aircraft, or multiple aircraft, average emissions per flight phase, flight, or aircraft, etc. In some examples, the information may be organized for specific periods of time, such as one month, one quarter, or one year according to an accounting system of a company. In some embodiments, the method 400 may include generating a graphic user interface on the display device and providing the capability to the user to purchase carbon credits to offset the determined emissions.

The systems and methods disclosed herein provide various benefits over certain existing systems and methods. For example, the systems and methods disclosed herein may allow users to track and manage emissions, such as carbon emissions, for individual aircraft as well as entire fleets of aircraft. Access to such information may allow users to manage their fleets, flights, individual aircraft, manner of use of the aircraft, maintenance activities, etc. to promote efficiency, fuel cost savings, and reduce emissions. In some embodiments, the systems and methods may promote the user's ability to meet reporting requirements of governments or other regulatory agencies. In some embodiments, the systems and methods may allow for the purchase of carbon credits for offsetting carbon emissions of the aircraft.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of determining carbon emissions for an aircraft, the method comprising:

receiving, with one or more processors of a controller, engine operation data from the aircraft indicating operating conditions of an engine of the aircraft during operation thereof;

determining, with the one or more processors of the controller, amounts of time that the engine was in each of two or more flight phases based on the engine operation data;

determining, with the one or more processors of the controller, that gaps in the engine operation data exist;

generating adjusted engine operation data by adjusting the engine operation data to accommodate for the gaps by estimating operating conditions of the engine to fill the gaps in coverage;

determining, with the one or more processors of the controller, a cumulative fuel consumption of the engine for one or more flights of the aircraft based on the adjusted engine operation data, the amounts of time that the engine was in each of the two or more flight phases, and fuel flow rates of the engine; and determining, with the one or more processors of the controller, engine carbon emissions based on the cumulative fuel consumption for the engine.

2. The method of claim 1, wherein determining the engine carbon emissions includes determining a first set of engine carbon emissions for the engine for each flight of the aircraft and a second set of engine carbon emissions for each of the two or more flight phases.

3. The method of claim 1, further comprising determining carbon emissions of the engine for each of the one or more flights.

4. The method of claim 1, wherein the adjusted engine operation data includes bin data that is binned to comprise units of time spent at various positions of a throttle of the aircraft, and determining the amounts of time that the engine was in each of the two or more flight phases includes mapping the bin data to each of the flight phases.

5. The method of claim 1, wherein determining the cumulative fuel consumption includes using a specific engine performance model that utilizes the configuration of the aircraft, configuration of the engine, and a type of fuel used in the engine.

6. The method of claim 1, further comprising:

storing engine carbon emissions data indicative of the engine carbon emissions in a database, wherein the engine carbon emissions data includes the adjusted engine operation data; and incorporating the engine carbon emissions into a set of emissions data for a fleet of multiple aircraft.

7. The method of claim 1, further comprising:

generating, on a graphical user interface, the engine carbon emissions to a user; and providing, on the graphic user interface, carbon credits for purchase by the user to offset the engine carbon emissions.

8. The method of claim 1, further comprising:

receiving air conditioning (A/C) operation data from a dedicated sensor of an A/C system of the aircraft indicating operating conditions of the A/C system;

determining A/C carbon emissions based on the operating conditions of the A/C system; and determining total carbon emissions of the aircraft that includes the engine carbon emissions and the A/C carbon emissions.

9. The method of claim 1, wherein the adjusted engine operation data is automatically transmitted from the aircraft to the controller through a communications network after each flight of the aircraft.

10. A system for determining carbon emissions for an aircraft, the system comprising:
- a communication system configured to receive engine operation data from the aircraft indicating operating conditions of an engine of the aircraft during operation thereof; and
- a controller operably coupled to the communication system and configured to, with one or more processors:
  - receive the engine operation data via the communication system;
  - determine that gaps of coverage exist in the engine operation data;
  - estimate the operating conditions of the engine to fill the gaps in coverage;
  - generate adjusted engine operation data that is indicative of the engine operation data after adjustment to fill the gaps in the coverage;
  - determine amounts of time that the engine was in each of two or more flight phases based on the adjusted engine operation data;
  - determine a cumulative fuel consumption of the engine for more than one flight of the aircraft based on the adjusted engine operation data, the amounts of time that the engine was in each of the two or more flight phases, and fuel flow rates of the engine; and
  - determine engine carbon emissions based on the cumulative fuel consumption for the engine.

11. The system of claim 10, wherein the controller is configured to, with the one or more processors, determine a first set of engine carbon emissions for the engine for each flight of the aircraft and a second set of engine carbon emissions for each of the two or more flight phases.

12. The system of claim 10, wherein the controller is configured to, with the one or more processors, determine carbon emissions of the engine for each of the more than one flight.

13. The system of claim 10, wherein the adjusted engine operation data includes bin data that is binned to comprise units of time spent at positions of a throttle of the aircraft, and wherein the controller is configured to, with the one or more processors, determine the amounts of time that the engine was in each of the two or more flight phases by mapping the bin data to each of the two or more flight phases.

14. The system of claim 10, wherein the controller is configured to, with the one or more processors, determine the cumulative fuel consumption based on a specific engine performance model that utilizes the configuration of the aircraft, configuration of the engine, and a type of fuel used in the engine.

15. The system of claim 10, wherein the controller is configured to, with the one or more processors:
- store engine carbon emissions data indicative of the engine carbon emissions in a database in operable communication with the controller, wherein the engine carbon emissions data includes the adjusted engine operation data; and
- incorporate the engine carbon emissions into a set of emissions data for a fleet of multiple aircraft.

16. The system of claim 10, wherein the controller is configured to, with the one or more processors:
- generate, on a display device, the engine carbon emissions to a user; and
- providing, on a graphical user interface on the display device, carbon credits for purchase by the user to offset the engine carbon emissions.

17. The system of claim 10, wherein the controller is configured to, with the one or more processors:
- receive air conditioning (A/C) operation data from a dedicated sensor of an A/C system of the aircraft indicating operating conditions of the A/C system;
- determine A/C carbon emissions based on the operating conditions of the A/C system; and
- determine total carbon emissions of the aircraft that includes the engine carbon emissions and the A/C carbon emissions.

18. The system of claim 10, wherein the adjusted engine operation data is automatically transmitted from the aircraft to the communication system through a communications network after each flight of the aircraft.

* * * * *